(12) United States Patent
Wu et al.

(10) Patent No.: US 11,790,073 B2
(45) Date of Patent: Oct. 17, 2023

(54) VIBRATION SIGNAL-BASED SMARTWATCH AUTHENTICATION METHOD

(71) Applicant: SHENZHEN UNIVERSITY, Shenzhen (CN)

(72) Inventors: Kaishun Wu, Shenzhen (CN); Yandao Huang, Shenzhen (CN); Lin Chen, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 630 days.

(21) Appl. No.: 17/035,752

(22) Filed: Sep. 29, 2020

(65) Prior Publication Data
US 2021/0240806 A1    Aug. 5, 2021

(30) Foreign Application Priority Data
Jul. 29, 2019   (CN) .......................... 201910687676.5

(51) Int. Cl.
*H04L 29/06* (2006.01)
*G06F 21/35* (2013.01)
(Continued)

(52) U.S. Cl.
CPC ............. *G06F 21/35* (2013.01); *G01M 7/025* (2013.01); *G06F 1/163* (2013.01); *G06F 9/3001* (2013.01);
(Continued)

(58) Field of Classification Search
CPC .. G06F 18/24147; G06F 18/214; G06F 1/163; G06F 9/3001; G06F 21/316; G01M 7/025
See application file for complete search history.

(56) References Cited

U.S. PATENT DOCUMENTS

2014/0179986 A1* 6/2014 Kelley ................. A61B 5/4806
600/26
2020/0043042 A1* 2/2020 Frost ................... G06Q 30/0252
(Continued)

*Primary Examiner* — Evans Desrosiers
(74) *Attorney, Agent, or Firm* — Bayramoglu Law Offices LLC

(57) ABSTRACT

A vibration signal-based smartwatch authentication method includes generating incremental vibration signals using a vibration motor in a smartwatch; performing frequency band-based hierarchical endpoint segmentation to obtain vibration signals at a plurality of frequency bands; extracting frequency-domain features for the vibration signals at the plurality of frequency bands; training a dynamic time warping model by taking the vibration signals at the plurality of frequency bands as a training data set, training a nearest neighbor model by taking the extracted frequency-domain features as training data; collecting to-be-authenticated vibration signals which are processed to serve as test data signals; discriminating similarities between the test data signals and corresponding training data signals through the dynamic time warping model, giving a classification result through the nearest neighbor model, performing weighted calculation on a discrimination result of the dynamic time warping model and a discrimination result of the nearest neighbor model to obtain an authentication result.

20 Claims, 1 Drawing Sheet

(51) Int. Cl.
  *G01M 7/02* (2006.01)
  *G06F 1/16* (2006.01)
  *G06F 9/30* (2018.01)
  *G06F 21/31* (2013.01)
  *G06F 18/214* (2023.01)
  *G06F 18/2413* (2023.01)
(52) U.S. Cl.
  CPC ...... *G06F 18/214* (2023.01); *G06F 18/24147* (2023.01); *G06F 21/316* (2013.01)

(56) References Cited

U.S. PATENT DOCUMENTS

2020/0181826 A1* 6/2020 Kim ...................... D06F 39/083
2020/0389551 A1* 12/2020 Vaughn ............. H04M 3/42059

* cited by examiner

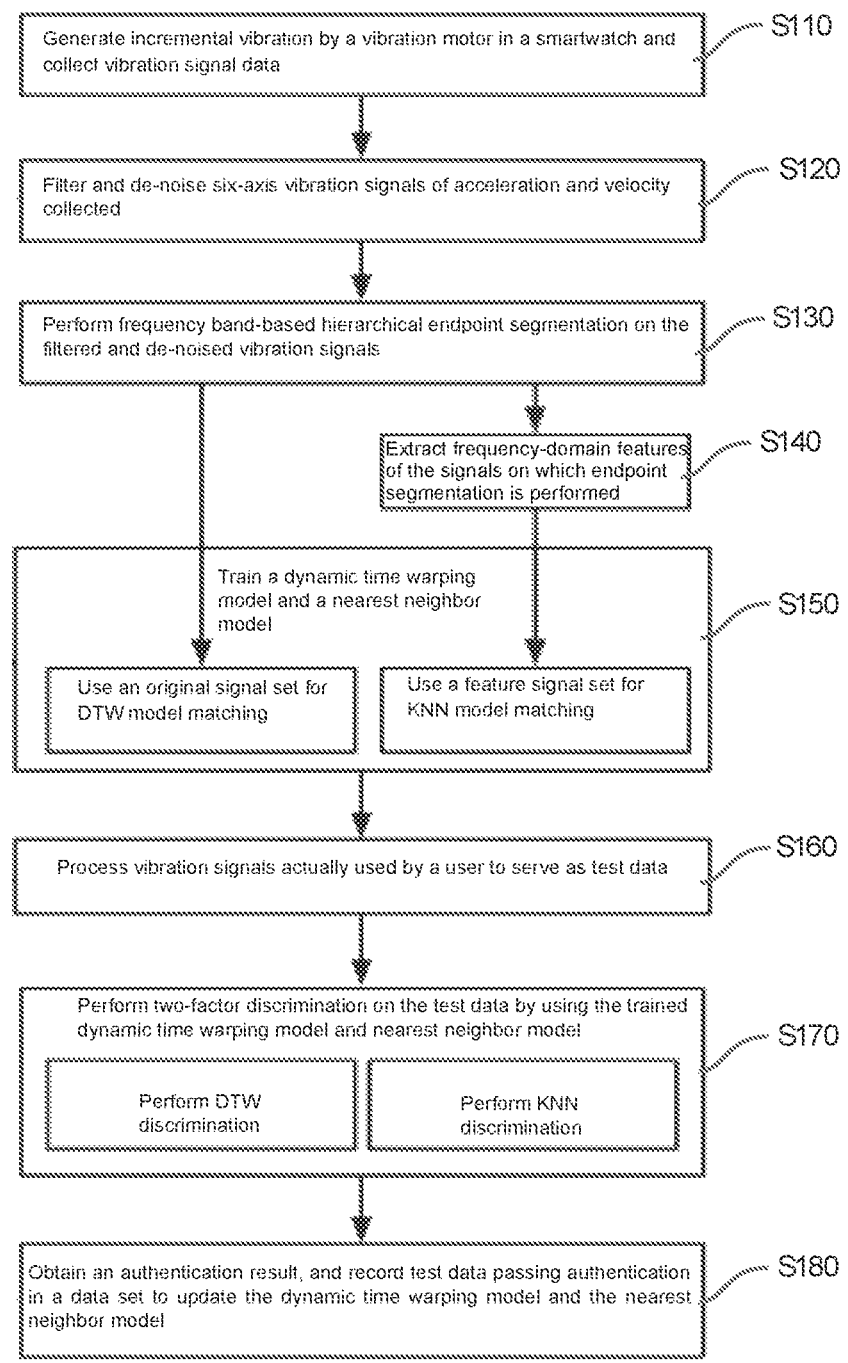

VIBRATION SIGNAL-BASED SMARTWATCH AUTHENTICATION METHOD

CROSS REFERENCE TO THE RELATED APPLICATIONS

This application is based upon and claims priority to Chinese Patent Application No. 201910687676.5, filed on Jul. 29, 2019, the entire contents of which are incorporated herein by reference.

TECHNICAL FIELD

The present invention relates to the field of information processing technologies, and in particular to a method for authenticating vibration signal-based smartwatch.

BACKGROUND

In the recent years, wearable devices are dramatically growing in popularity. Global research and advisory firm Gartner has forecasted that the wearable devices are expected to surpass smartphones in market sales by 2020, reaching $6.17 billion. Specifically, smartwatches and smart wristbands represent a dominant force in the wearable ecosystem that are widely used for tracking physical health data. Additional usages of smartwatches and smart wristbands tend to be for mobile payments, transportation ticketing, etc. As these wearable devices become increasingly personal, they pose a serious threat to privacy and security of users as the devices often generate sensitive private data of the users. However, the sensitive private data, such as the original sensor data, is used by wearable applications to infer personal activities, health, some may even be used by wearable devices to perform SMS messaging and online payment functions. One way to ensure security is to authenticate the users of the wearable devices and implementing access control.

Traditional smart terminal authentication methods generally rely on bulky hardware and user interfaces that are not suitable for the wearable devices. For example, a password keyboard generally requires a touch screen and a user's capacity to remember the password, which is vulnerable to internet hackers/criminals, these traditional methods are not considered as the true user authentication function. Moreover, biometric identifiers such as fingerprints, face recognition, voice recognition, and the like are also vulnerable to cyber criminals. Additionally, they require specialized hardware to implement. Lastly, hardware for biometric identifiers typically do not come in sizes suitable for wearable devices without special configuration that increasing its cost, making it impractical to use.

Therefore, a new and improved method for smartwatch authentication is needed.

SUMMARY

To overcome the issues with smartwatch authentication, the present invention provides a vibration signal-based smartwatch authentication method. The method includes the following steps:

step S1, generating incremental vibration by using the vibration motor in a smartwatch and collecting six-axis vibration signals which are separately generated by the three-axis acceleration and the three-axis angular velocity;

step S2, filtering and de-noising the collected vibration signals and performing frequency band-based hierarchical endpoint segmentation to obtain vibration signals at a plurality of frequency bands;

step S3, extracting frequency-domain features for the vibration signals at the plurality of frequency bands;

step S4, training a dynamic time warping model by using the vibration signals at the plurality of frequency bands as training data set, and training a nearest neighbor model by using the extracted frequency-domain features as training data;

step S5, collecting to-be-authenticated vibration signals and performing the processing of step S2 and step S3 to form test data signals; and step S6, discriminating the similarities between the test data signals and corresponding training data signals through the dynamic time warping model, determining a classification result through the nearest neighbor model, and performing weighted calculation on the discrimination result of the dynamic time warping model and the discrimination result of the nearest neighbor model to obtain an authentication result.

In one embodiment, the method further includes: storing a vibration signal as a sample in a database when the authentication result is valid, when the number of samples exceeds a preset threshold, re-training the dynamic time warping model and the nearest neighbor model.

In one embodiment, the six-axis vibration signals are obtained according to the following steps:

positioning the smartwatch on an user's wrist, the smartwatch being close contact with the user's skin while the user's arm remains static and stable state;

generating, by the vibration motor in the smartwatch, incremental vibration in which vibration amplitude varies from weak to strong over time, corresponding to a vibration frequency varies from weak to strong over time; and collecting three-axis acceleration vibration signals using the accelerometer in the smartwatch, and collecting three-axis angular velocity vibration signals using a gyroscope, to obtain the six-axis vibration signals.

In one embodiment, the filtering and de-noising of the collected vibration signals includes: filtering out, by a notch filter, the vibration information of the frequency point for each interval frequency point in the incremental vibration in which the vibration frequency varies from weak to strong over time.

In one embodiment, the performing frequency band-based hierarchical endpoint segmentation includes: delimiting the incremental vibration according to vibration duration of each frequency point, and dividing the incremental vibration into a plurality of segments for the incremental vibration in which the vibration frequency varies from weak to strong over time, the main vibration frequency in each segment remains stable and consistent.

In one embodiment, step S6 includes:

correspondingly matching, by the dynamic time warping model, hierarchically segmented signals at each frequency band, calculating a similarity level between a test data signal and a training data signal under each frequency band, and obtaining a first weight similarity level by calculating an arithmetic mean;

discriminating, by the nearest neighbor model, the test data signal and the training data signal after frequency-domain feature extraction, to obtain a second weight similarity level; and performing weighted averaging on the first weight similarity level and the second weight similarity level to obtain the authentication result.

In one embodiment, the first weight similarity level and the second weight similarity level each account for 50% of the weight of the authentication result.

Compared with the prior art, the present invention has the following beneficial effects: based on vibration signals, validity of a user identity is determined by using hardware devices that are supported by most existing commercial smartwatches, such as, a vibration motor and an inertial sensor unit, and combining a dynamic time warping algorithm of machine learning and a nearest neighbor algorithm to form two-factor discrimination. The present invention is inexpensive to implement while guarantees the safety and integrity of the hardware of the smartwatch devices. In addition, the authentication method of the present invention is reliable, applicable to a wide range of users, and meets the authentication requirements of all smartwatch related applications.

BRIEF DESCRIPTION OF THE DRAWINGS

The following accompanying drawings are merely schematic illustration and explanation to the present invention and are not intended to limit the scope of the present invention.

FIGURE shows a flowchart of a vibration signal-based smartwatch authentication method according to an embodiment of the present invention.

DETAILED DESCRIPTION OF THE EMBODIMENTS

In order to meet the objectives, technical solutions, design methods, and advantages of the present invention stated above, the present invention is described in further detail below with reference to the accompanying drawing and specific embodiments. It should be understood that the specific embodiments described herein are used only to interpret the present invention and not to limit the present invention. In all of the examples shown and discussed herein, any specific value should be interpreted as merely exemplary and not as limitations. Therefore, other examples of exemplary embodiments may have different values. Technologies, methods, and devices known to those of ordinary skill in the art may not be discussed in detail but, where appropriate, the technologies, methods, and devices described should be considered as part of the specification.

Referring to the FIGURE, a vibration signal-based smartwatch authentication method includes the following steps.

Step S110: an incremental vibration is generated by using a vibration motor that is in a smartwatch, and collect the vibration signal data.

Vibration generated by the vibration motor of the smartwatch will undergo processes such as reflection, diffraction, attenuation, and filtering during propagation of an arm cavity. For legitimate users, this process is unlikely to change in a short period of time. However, for illegitimate users, because of the complex physiological structure of the human body, the process is likely to be inconsistent with the legitimate users, this inconsistency will cause a refusal in obtaining authorization to pass a device security authentication system. The present invention utilizes this principle to collect vibration signals and identify legitimate and illegitimate users by analyzing and extracting features of the vibration signals.

Specifically, the smartwatch is normally worn on a wrist in close contact with skin, incremental vibration, in which vibration amplitude varies from weak to strong over time and a vibration frequency varies from weak to strong over time, is generated by using the vibration motor that is in the smartwatch while the user's arm is in a static and stable state during vibration.

Generally, smartwatches are provided with inertial sensors, such as accelerometer and gyroscope. During the incremental vibration, the accelerometer in the smartwatch is used to collect three-axis acceleration information, and the gyroscope is used to collect three-axis angular velocity information. The collected six-axis vibration signals of acceleration and velocity represent movement of the vibration motor in a three-dimensional space, known as the vibration signal features.

S120: the collected six-axis vibration signals of acceleration and velocity are filtered and de-noised.

In order to eliminate noise interference in the vibration signals, the collected six-axis vibration signals of acceleration and velocity are filtered and de-noised. For example, for each interval frequency point in the incremental vibration in which the vibration frequency varies from weak to strong over time, vibration information of the frequency point is filtered out by using a notch filter.

S130: frequency band-based hierarchical endpoint segmentation is performed on the filtered and de-noised vibration signals.

The frequency band-based hierarchical endpoint segmentation is performed on the filtered and de-noised vibration signals, the incremental vibration is delimited according to vibration duration of each frequency point, and the incremental vibration is divided into a plurality of segments, a main vibration frequency in each segment remaining stable and consistent. In this way, the vibration process can be divided into a plurality of segments, and the vibration signal in each segment may be represented by a main vibration frequency and vibration duration.

S140: frequency-domain features are extracted from the signals on which endpoint segmentation is performed.

Frequency-domain features are extracted from the vibration signals after endpoint segmentation. The frequency-domain features extracted include, but are not limited to, amplitude-frequency characteristics, phase-frequency characteristics, etc. The process of extracting frequency-domain features is generally known in the prior arts, which is not described herein.

S150: a dynamic time warping model and a nearest neighbor model are trained.

In this step, a set of the collected vibration signal data is stored in the smartwatch, and model matching training is performed. Specifically, original signals after endpoint segmentation (that is, the vibration signals for which frequency-domain features are not extracted) are taken as training data to train a dynamic time warping (DTW) model; the extracted feature signals are taken as training data to train a nearest neighbor (KNN) model.

The dynamic time warping model can calculate a similarity level between two time sequences. In the present invention, the vibration signals (that is, the original signals from which features are not extracted) after filtering, de-noising, and endpoint segmentation are used for dynamic time warping model matching.

A frequency-domain feature signal set is used for nearest neighbor (KNN) model matching. The working principle of KNN is as follows: within a training sample set, each piece of data includes a label to determine a corresponding relationship between each sample in the sample set and its category. After new data which does not include any labels is inputted into the model, each feature of the new data is compared with the corresponding feature of the data in the sample set, and then a classification label with the most similar data (nearest neighbor) in the sample set is extracted to serves as a basis for determining a classification label of the new data. For example, distances between the new data and training data are calculated; the distances are sorted in increasing order; k points with the minimum distance are selected; and a frequency of occurrence of a category in which first k points are located (or a similarity between the new data and the training data) is determined.

S160: vibration signals that are actually used by a user are processed to serve as test data.

Vibration signals in actual use are taken as test data. The process of processing the test data is similar to steps S110 to S140. For the vibration signals actually used, vibration signal data is collected by the accelerometer and gyroscope that are in the smartwatch; filter and de-noise the collected six-axis vibration signals of acceleration and velocity; perform frequency band-based hierarchical endpoint segmentation for the filtered and de-noised vibration signals; extract frequency-domain features from the signals on which endpoint segmentation is performed.

S170: two-factor discrimination is performed on the test data by using the trained dynamic time warping model and nearest neighbor model.

The dynamic time warping model gives discrimination to obtain a similarity level between the test data and a training set signal. The nearest neighbor model gives a classification result. Weighted calculation is performed on the results given by the two models to obtain an authentication result.

Specifically, the dynamic time warping model may correspondingly match a hierarchically segmented signal at each frequency band, calculate the similarity level between a test signal and a training signal under each frequency band, and calculate an arithmetic mean of them to obtain a final similarity level. The similarity level is also referred to as a first weight similarity level, for example, it may account for 50% of the final discrimination. The nearest neighbor model discriminates the test signal and the training signal upon feature extraction to obtain a second weight similarity level. For example, it may also account for 50% of the final discrimination. If the similarity level finally obtained is greater than a threshold, for example, more than 70% (or other values), the user is authenticated as a legitimate user, and otherwise, the user fails authentication as an illegitimate user. Here, the method for obtaining a final authentication result by integrating discrimination of the dynamic time warping model and discrimination of the nearest neighbor model is referred to as two-factor discrimination.

S180: an authentication result is obtained, and test data passing authentication is recorded in a data set to update the dynamic time warping model and the nearest neighbor model.

After the authentication result, e.g., a legitimate user or an illegitimate user, is obtained through two-factor discrimination, the test data corresponding to the final discrimination being the legitimate user is taken as a sample to be stored in a database. When the number of samples exceeds a certain number, the two training models, namely, the dynamic time warping model and the nearest neighbor model are updated.

By updating the two training models, the problem of a large discrimination error caused by time instability can be avoided. This is because even for the legitimate user, the vibration process may change over time. Therefore, when the number of samples reaches certain threshold, the samples are taken as training data to re-train the dynamic time warping model and the nearest neighbor model.

Based on the above, in the embodiments of the present invention, vibration is generated by using a vibration motor in a smartwatch, and vibration signals absorbed by the human body are collected by using an inertial sensor unit that is also in the smartwatch. Implementing a smartwatch authentication method through information technology processing is more secure, convenient, and practical without privacy risk. In the present invention, the method can be directly implemented in existing commercial smartwatches or even smart bracelets that are embedded with a vibration motor and an inertial sensor, irrespective of whether the smart bracelets have a screen. The method of present invention is more secure and practical compared with the traditional smartwatch authentication method.

It should be noted that although the steps are described above in a particular order, it does not mean that the steps must be executed in that particular order. In fact, some of the steps can be executed concurrently, or even in a different order, provided that required functions can be implemented.

The present invention includes a system, a method, and/or at least an electronic product. The electronic product may include a readable storage medium storing readable program instructions for enabling a processor to implement various aspects of the present invention.

The readable storage medium may be a physical device capable of retaining and storing instructions used by an instruction-executing device. The readable storage medium may be, for example, but is not limited to, an electrical storage device, a magnetic storage device, an optical storage device, an electromagnetic storage device, a semiconductor storage device, or any appropriate combination of the above. In a more specific example (a non-exhaustive list), the readable storage medium includes: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punched card or protrusions in a groove on which instructions are stored, and any appropriate combination of the above.

Various embodiments of the present invention have been described above, and the foregoing description is illustrative rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments, or technical improvements of the technologies on the market, or to enable other persons of ordinary skill in the art to understand the embodiments disclosed herein.

What is claimed is:

1. A method for authenticating a smartwatch using a vibration signal-based authentication, comprising the following steps:

step 1, generating an incremental vibration by using a vibration motor in the smartwatch and collecting six-axis vibration signals of a three-axis acceleration and a three-axis angular velocity;

step 2, filtering and de-noising collected six-axis vibration signals and performing a frequency band-based hierarchical endpoint segmentation on filtered and de-noised six-axis vibration signals to obtain the six-axis vibration signals at a plurality of frequency bands;

step 3, extracting frequency-domain features for the six-axis vibration signals at the plurality of frequency bands;

step 4, training a dynamic time warping model by taking the six-axis vibration signals at the plurality of frequency bands as a training data set, and training a nearest neighbor model by taking extracted frequency-domain features as training data;

step 5, collecting to-be-authenticated vibration signals, processing the to-be-authenticated vibration signals by step 2 and step 3 to form test data signals; and step 6, discriminating similarities between the test data signals and training data signals corresponding to the test data signals through the dynamic time warping model, determining a classification result through the nearest neighbor model, and performing a weighted calculation on a discrimination result of the dynamic time warping model and a discrimination result of the nearest neighbor model, to obtain an authentication result.

2. The method according to claim 1, further comprising: storing a vibration signal of a legitimate user as a sample in a database, when a number of samples exceeds a preset threshold, re-training the dynamic time warping model and the nearest neighbor model.

3. The method according to claim 1, wherein the six-axis vibration signals are obtained according to the following steps:

placing the smartwatch at a wrist of a user, wherein the smartwatch is in contact with a skin, wherein an arm of the wrist is in a static and stable state;

generating, by the vibration motor in the smartwatch, the incremental vibration, wherein a vibration amplitude of the incremental vibration varies from weak to strong over time, wherein a vibration frequency corresponding with the incremental vibration varies from weak to strong over time; and collecting three-axis acceleration vibration signals through an accelerometer in the smartwatch and collecting three-axis angular velocity vibration signals through a gyroscope to obtain the six-axis vibration signals.

4. The method according to claim 3, wherein filtering and de-noising the collected six-axis vibration signals comprises: filtering out vibration information of a frequency point using a notch filter for each interval frequency point in the incremental vibration, wherein the vibration frequency varies from weak to strong over time in the incremental vibration.

5. The method according to claim 3, wherein performing the frequency band-based hierarchical endpoint segmentation comprises: delimiting the incremental vibration according to a vibration duration of each frequency point for the incremental vibration, wherein the vibration frequency varies from weak to strong over time in the incremental vibration, and dividing the incremental vibration into a plurality of segments, wherein a main vibration frequency in each segment of the plurality of segments remains stable and consistent.

6. The method according to claim 1, wherein step 6 comprises:

correspondingly matching, by the dynamic time warping model, hierarchically segmented signals at each frequency band of the plurality of frequency bands, calculating a similarity level between a test data signal of the test data signals and a training data signal of the training data signals under the each frequency band, and obtaining a first weight similarity level by calculating an arithmetic mean;

discriminating, by the nearest neighbor model, the test data signal of the test data signals and the training data signal of the training data signals upon a frequency-domain feature extraction, to obtain a second weight similarity level; and performing a weighted averaging on the first weight similarity level and the second weight similarity level to obtain the authentication result.

7. The method according to claim 6, wherein the first weight similarity level and the second weight similarity level each account for 50% of a weight of the authentication result.

8. A non-transitory readable storage medium, comprising a computer program stored on the readable storage medium, wherein when the computer program is executed by a processor, steps of the method according to claim 1 is implemented.

9. An electronic device, comprising a memory and a processor, wherein the memory stores a computer program runnable on the processor, when the processor executes the computer program, steps of the method according to claim 1 is implemented.

10. The non-transitory readable storage medium according to claim 8, wherein the method further comprises storing a vibration signal of a legitimate user as a sample in a database, when a number of samples exceeds a preset threshold, re-training the dynamic time warping model and the nearest neighbor model.

11. The non-transitory readable storage medium according to claim 8, wherein the six-axis vibration signals are obtained according to the following steps:

placing the smartwatch at a wrist of a user, wherein the smartwatch is in contact with a skin, wherein an arm of the wrist is in a static and stable state;

generating, by the vibration motor in the smartwatch, the incremental vibration, wherein a vibration amplitude of the incremental vibration varies from weak to strong over time, wherein a vibration frequency corresponding with the incremental vibration varies from weak to strong over time; and collecting three-axis acceleration vibration signals through an accelerometer in the smartwatch and collecting three-axis angular velocity vibration signals through a gyroscope to obtain the six-axis vibration signals.

12. The non-transitory readable storage medium according to claim 11, wherein filtering and de-noising the collected six-axis vibration signals comprises: filtering out vibration information of a frequency point using a notch filter for each interval frequency point in the incremental vibration, wherein the vibration frequency varies from weak to strong over time in the incremental vibration.

13. The non-transitory readable storage medium according to claim 11, wherein performing the frequency band-based hierarchical endpoint segmentation comprises: delimiting the incremental vibration according to a vibration duration of each frequency point for the incremental vibration, wherein the vibration frequency varies from weak to strong over time in the incremental vibration, and dividing the incremental vibration into a plurality of segments, wherein a main vibration frequency in each segment of the plurality of segments remains stable and consistent.

14. The non-transitory readable storage medium according to claim 8, wherein step 6 comprises:
- correspondingly matching, by the dynamic time warping model, hierarchically segmented signals at each frequency band of the plurality of frequency bands, calculating a similarity level between a test data signal of the test data signals and a training data signal of the training data signals under the each frequency band, and obtaining a first weight similarity level by calculating an arithmetic mean;
- discriminating, by the nearest neighbor model, the test data signal of the test data signals and the training data signal of the training data signals upon a frequency-domain feature extraction, to obtain a second weight similarity level; and
- performing a weighted averaging on the first weight similarity level and the second weight similarity level to obtain the authentication result.

15. The non-transitory readable storage medium according to claim 14, wherein the first weight similarity level and the second weight similarity level each account for 50% of a weight of the authentication result.

16. The electronic device according to claim 9, wherein the method further comprises storing a vibration signal of a legitimate user as a sample in a database, when a number of samples exceeds a preset threshold, re-training the dynamic time warping model and the nearest neighbor model.

17. The electronic device according to claim 9, wherein the six-axis vibration signals are obtained according to the following steps:
- placing the smartwatch at a wrist of a user, wherein the smartwatch is in contact with a skin, wherein an arm of the wrist is in a static and stable state;
- generating, by the vibration motor in the smartwatch, the incremental vibration, wherein a vibration amplitude of the incremental vibration varies from weak to strong over time, wherein a vibration frequency corresponding with the incremental vibration varies from weak to strong over time; and
- collecting three-axis acceleration vibration signals through an accelerometer in the smartwatch and collecting three-axis angular velocity vibration signals through a gyroscope to obtain the six-axis vibration signals.

18. The electronic device according to claim 17, wherein filtering and de-noising the collected six-axis vibration signals comprises: filtering out vibration information of a frequency point using a notch filter for each interval frequency point in the incremental vibration, wherein the vibration frequency varies from weak to strong over time in the incremental vibration.

19. The electronic device according to claim 17, wherein performing the frequency band-based hierarchical endpoint segmentation comprises: delimiting the incremental vibration according to a vibration duration of each frequency point for the incremental vibration, wherein the vibration frequency varies from weak to strong over time in the incremental vibration, and dividing the incremental vibration into a plurality of segments, wherein a main vibration frequency in each segment of the plurality of segments remains stable and consistent.

20. The electronic device according to claim 9, wherein step 6 comprises:
- correspondingly matching, by the dynamic time warping model, hierarchically segmented signals at each frequency band of the plurality of frequency bands, calculating a similarity level between a test data signal of the test data signals and a training data signal of the training data signals under the each frequency band, and obtaining a first weight similarity level by calculating an arithmetic mean;
- discriminating, by the nearest neighbor model, the test data signal of the test data signals and the training data signal of the training data signals upon a frequency-domain feature extraction, to obtain a second weight similarity level; and
- performing a weighted averaging on the first weight similarity level and the second weight similarity level to obtain the authentication result.

* * * * *